United States Patent
Kim et al.

(10) Patent No.: US 10,696,830 B2
(45) Date of Patent: Jun. 30, 2020

(54) POLYOLEFIN RESIN, PREPARATION METHOD THEREFOR, AND VEHICLE REAR BUMPER BEAM USING SAME

(71) Applicants: LOTTE CHEMICAL CORPORATION, Seoul (KR); SEOYON E-HWA CO., LTD, Seoul (KR)

(72) Inventors: Young Bum Kim, Daejeon (KR); Choul Won So, Daejeon (KR); Seung Wook Park, Daejeon (KR); In Kwang Lee, Busan (KR); Dong Wook Kim, Ulsan (KR)

(73) Assignees: LOTTE CHEMICAL CORPORATION, Seoul (KR); SEOYON E-HWA CO., LTD, Seoul (KR)

( * ) Notice: Subject to any disclaimer, the term of this patent is extended or adjusted under 35 U.S.C. 154(b) by 231 days.

(21) Appl. No.: 15/740,891

(22) PCT Filed: Apr. 4, 2016

(86) PCT No.: PCT/KR2016/003443
§ 371 (c)(1),
(2) Date: Dec. 29, 2017

(87) PCT Pub. No.: WO2017/003070
PCT Pub. Date: Jan. 5, 2017

(65) Prior Publication Data
US 2018/0186984 A1  Jul. 5, 2018

(30) Foreign Application Priority Data

Jun. 29, 2015 (KR) .................. 10-2015-0092074
Aug. 17, 2015 (KR) .................. 10-2015-0115596
Mar. 31, 2016 (KR) .................. 10-2016-0039019

(51) Int. Cl.
*B60R 19/02* (2006.01)
*B60R 19/18* (2006.01)
(Continued)

(52) U.S. Cl.
CPC .............. *C08L 23/12* (2013.01); *B60R 19/02* (2013.01); *B60R 19/18* (2013.01); *C08J 5/04* (2013.01);
(Continued)

(58) Field of Classification Search
CPC .. B60R 19/02; B60R 19/18; C08J 5/04; C08J 5/043; C08J 2323/12; C08J 2453/00; C08L 23/12; C08K 7/14
(Continued)

(56) References Cited

U.S. PATENT DOCUMENTS 9,428,637 B2 * 8/2016 Kohler ................ C08L 23/0815
2003/0047952 A1 3/2003 Trappe
(Continued)

FOREIGN PATENT DOCUMENTS

EP 2821434 A1 1/2015
JP H04-082717 A 3/1992
(Continued)

*Primary Examiner* — Kelechi C Egwim
(74) *Attorney, Agent, or Firm* — Paratus Law Group, PLLC (57) ABSTRACT

Disclosed is a polyolefin resin, a method for preparing the same, and a vehicle rear bumper beam using the same. The polyolefin resin is characterized by being composed of a thermoplastic resin composite including a polymer base including a polypropylene homopolymer, which has a molecular weight distribution of 2 to 10, and a colorant; and a fiber reinforcing material that is impregnated into the polymer base and has a length of 5 to 20 mm, wherein 10 to 50 wt % of the fiber reinforcing material is included with respect to the polyolefin resin. The method is characterized (Continued)

in that a thermoplastic resin composite is formed by impregnating a molten mixture including a polypropylene homopolymer, which has a molecular weight distribution of 2 to 10, and a colorant with a fiber reinforcing material having a length of 5 to 20 mm.

8 Claims, 7 Drawing Sheets

(51) Int. Cl.
*C08J 5/04* (2006.01)
*C08K 7/14* (2006.01)
*C08L 23/12* (2006.01)

(52) U.S. Cl.
CPC ........... *C08J 5/043* (2013.01); *C08J 2323/12* (2013.01); *C08J 2453/00* (2013.01); *C08K 7/14* (2013.01)

(58) Field of Classification Search
USPC ........................................................ 524/582
See application file for complete search history.

(56) References Cited

U.S. PATENT DOCUMENTS

2006/0264544 A1* 11/2006 Lustiger ............... B29C 48/40
524/284
2010/0125118 A1 5/2010 Brant et al.
2015/0159003 A1 6/2015 Son et al.

FOREIGN PATENT DOCUMENTS

| | | |
|---|---|---|
| JP | 2000-109613 A | 4/2000 |
| JP | 2005-502521 A | 1/2005 |
| JP | 2005-082786 A | 3/2005 |
| JP | 2007-186687 A | 7/2007 |
| JP | 2008-179785 A | 8/2008 |
| JP | 2010-163614 A | 7/2010 |
| JP | 2010-538104 A | 12/2010 |
| JP | 2014-208802 A | 11/2014 |
| JP | 2016-210987 A | 12/2016 |
| KR | 10-2004-0033044 A | 4/2004 |
| KR | 10-2009-0022835 A | 3/2009 |
| KR | 10-2009-0064840 A | 6/2009 |
| KR | 10-0917651 B1 | 9/2009 |
| KR | 10-2013-0011774 A | 1/2013 |
| KR | 10-1365057 B1 | 2/2014 |
| KR | 10-1457995 B1 | 11/2014 |
| KR | 10-1521147 B1 | 5/2015 |
| WO | WO 2006/125036 A2 | 11/2006 |

* cited by examiner

Before crash

After crash

Fig. 6

Before crash

After crash

Fig. 7

Before crash

After crash

POLYOLEFIN RESIN, PREPARATION METHOD THEREFOR, AND VEHICLE REAR BUMPER BEAM USING SAME

CROSS REFERENCE TO PRIOR APPLICATIONS

This application is a National Stage Patent Application of PCT International Patent Application No. PCT/KR2016/003443 (filed on Apr. 4, 2016) under 35 U.S.C. § 371, which claims priority to Korean Patent Application Nos. 10-2015-0092074 (filed on Jun. 29, 2015), 10-2015-0115596 (filed on Aug. 17, 2015), and 10-2016-0039019 (filed on Mar. 31, 2016), which are all hereby incorporated by reference in their entirety.

TECHNICAL FIELD

The present invention relates to a polyolefin resin, a method for preparing the same, and a vehicle rear bumper beam using the same.

BACKGROUND ART

Typically, vehicle bumper beams are required to pass legally mandated low-speed crash tests and quasi-legally mandated property insurance organization (ROAR, IIHS) tests. Here, the standards required by property insurance organizations are more stringent than those required by law, and depending on the region, both tests or only the legally mandated low-speed crash test is required. Thus, most finished vehicle manufacturers adopt high-strength bumper beams when required to satisfy property insurance organization-mandated tests, but adopt low-cost bumper beams in regions requiring only low speed crash tests mandated by law, thereby achieving vehicle price competitiveness.

Bumper beams designed to pass legally mandated low-speed crash tests are typically manufactured by injection molding, and thus, in terms of materials, various injection moldable materials may be used. However, it is necessary for bumper beams to exhibit the same performance satisfying low-speed crash performance requirements in various seasonal and use conditions, and so achieve dimensional stability such that there are no problems with respect to assembly and repairs. Accordingly, injection-molded bumper beams manufactured from PP-based materials and PC and PBT materials are typically used in regions with low seasonal and temperature variance.

However, applying materials such those described above to regions that experience both mild and low temperatures, or developing a single bumper beam that can be used in both temperate and low-temperature regions, is difficult, and thus vehicle manufacturers wanting to use a single bumper beam in various regions prefer glass fiber-containing composite plastic materials to those described above.

Composite plastic materials including glass fiber can be press-molded or injection-molded depending on fiber length, and longer glass fibers, although advantageous in terms of bumper beam strength, require press molding, which involves higher production costs than injection molding. Thus, since injection molding is advantageous with respect to lowering production costs but necessitates shorter glass fibers, injection-molded bumpers suffer more damage when subjected to legally mandated low-speed crash tests, and result in damage to the vehicle body. Thus, there is a limitation in that legal requirements cannot be satisfied. That is, currently, since it is necessary to adopt press molding in order to satisfy legal performance requirements for bumper beams using glass fiber-containing composite plastic materials, reducing productions costs is difficult.

In order to overcome such limitations, measures to strengthen the mechanical properties of polyolefin resin, which is a commonly used plastic that is easily molded, by mixing and stirring polyolefin resin with glass fiber have been continuously researched. However, in such methods, most of the glass fiber is significantly damaged inside roll-milling/mixing equipment, such that extremely short glass fibers are mixed with the polyolefin resin. Thus, strength improvement in products has been limited.

Therefore, there can be said to be a demand for developing a novel resin composition that is reinforced with glass fiber in the form of a long fiber and thus able to maintain a low specific gravity while exhibiting at least a desired level of mechanical properties, in particular, high impact strength.

For reference, see Korean Patent Nos. 10-0917651, 10-1457995 and 10-1365057, in which the background art for the present invention is disclosed.

DISCLOSURE OF THE INVENTION

Technical Problem

The present invention was conceived of in order to overcome the limitations of the conventional art described above, and an object of the present invention is to provide a polyolefin resin having high impact strength and exhibiting excellent impact absorbing performance in the event of a crash, and a method for preparing the same.

Moreover, another object of the present invention is to provide a vehicle rear bumper beam in which crash energy absorption performance is improved such that the bumper beam can be injection-molded using a composite plastic material that includes glass fiber, and in which, as a result, processing costs are reduced such that product costs may be minimized, and dimensional and performance stability are achieved in room-temperature and low-temperature environments, thus making it possible to satisfy low-speed crash performance requirements.

Technical Solution

As a means for resolving the technical problem described above,
the present invention provides a polyolefin resin characterized by being composed of a thermoplastic resin composite including a polymer base including a polypropylene homopolymer, which has a molecular weight distribution of 2 to 10, and a colorant; and a fiber reinforcing material that is impregnated into the polymer base and has a length of 5 to 20 mm, wherein 10 to 50 wt % of the fiber reinforcing material is included with respect to the polyolefin resin.

Here, the impact strength (ASTM D256) of the polyolefin resin may be at least 200 J/m.

Here, the weight ratio between the fiber reinforcing material and the propylene homopolymer may be 1:1.5 to 1:10.

Here, the weight ratio between the colorant and the fiber reinforcing material may be 1:1 to 1:50.

Here, the polymer base may further include one or more additives selected from the group consisting of an impact modifier, an inorganic filler, a UV blocker, an antioxidant, a lubricating agent, an antistatic agent, a compatibilizer, and a fine particle.

Here, the impact modifier may include an olefin block copolymer including an ethylene-based repeating unit and an α-olefin-based repeating unit having a carbon number of 4 to 30.

Here, the olefin block copolymer may have a melt flow index (ASTM D1238, 230° C., measured under a load of 2.16 kg) of 2 to 50 g/10 min.

Here, the polyolefin resin may be a pellet form having a length of 1 to 500 mm and a cross-sectional diameter of 0.1 to 50 mm.

Moreover, the present invention provides a method for preparing a polyolefin resin, the method being characterized in that a thermoplastic resin composite is formed by impregnating a molten mixture including a polypropylene homopolymer, which has a molecular weight distribution of 2 to 10, and a colorant with a fiber reinforcing material having a length of 5 to 20 mm.

Furthermore, the present invention provides a vehicle rear bumper beam that is injection-molded using the polyolefin resin, the vehicle rear bumper beam being characterized by including a support part having an H-shaped cross-sectional structure composed of two vertical plates, which are disposed parallel to each other, and a horizontal plate, which connects the two vertical plates, one end of the support part being mounted to the vehicle; and an energy absorbing part formed on the opposite end of the support part.

Advantageous Effects

According to the present invention, a polyolefin resin and a method for preparing the same are provided, the polyolefin resin including a polymer base, which includes a polypropylene homopolymer having a predetermined molecular weight distribution and a colorant, and a fiber reinforcing material that is impregnated into the polymer base and has a predetermined length, and thus being able to maintain a low specific gravity while attaining at least a certain level of mechanical properties and a high impact strength.

Moreover, a vehicle rear bumper beam is provided, wherein not only is minimizing product costs by significantly reducing processing costs possible due to it being possible to utilize injection molding even when using a fiber reinforcing material in a long-fiber state, but dimensional and performance stability are achieved in room-temperature and low-temperature environments, thus making it possible to satisfy low-speed crash performance required by law.

MODE FOR CARRYING OUT THE INVENTION

Hereinafter, embodiments of the present invention are described in detail with reference to the accompanying drawings so that the present invention could be easily carried out by a person with ordinary skill in the art. However, the present invention may be embodied in a variety of different forms, and is not limited to the embodiments described herein. Moreover, in the drawings, parts that are not relevant to the description have been excluded for clarity of description. Throughout the specification, like elements are described by being assigned like reference numbers.

In the present specification '(homo)polymer' indicates a polymer that has been polymerized using only one monomer among ethylene, propylene, and α-olefin, and '(olefin) block copolymer' indicates a copolymer obtained by copolymerizing ethylene or propylene α-olefin, the copolymer including a plurality of repeating units or segments that can be distinguished from each other in the polymer due to having different values of physical or chemical properties thereof, the physical or chemical properties being one or more among, for example, the content (mole fraction) of repeating units respectively derived from ethylene or propylene and α-olefin, degree of crystallinity, density, or melting point and the like.

A polyolefin resin of the present invention is composed of a thermoplastic resin composite including a polymer base, which includes a propylene homopolymer having a molecular weight distribution of 2 to 10 and a colorant, and a fiber reinforcing material, which is impregnated into such a polymer base and has a length of 5 to 20 mm.

The thermoplastic resin composite may be formed using a method in which, for example, a fiber reinforcing material having a length of 5 to 20 mm is impregnated into a molten mixture including a propylene homopolymer, having a molecular weight distribution of 2 to 10, and a colorant. A polyolefin resin composed of a thermoplastic resin composite formed using such a method may be manufactured into a pellet form having a length of 1 to 500 mm and a cross-sectional diameter of 0.1 to 50 mm, and thereby used in the injection molding of a vehicle rear bumper beam. The polyolefin resin formed in such a manner may have excellent strength, with an impact strength of at least 200 J/m as measured according to ASTM D256 using an injection-molded sample.

The propylene homopolymer has a molecular weight distribution (MWD) of 2 to 10, which is a molecular weight distribution suitable for injection molding of a vehicle rear bumper beam described below, and may desirably have a molecular weight distribution of 4 to 6. When the molecular weight distribution is less than 2, injection molding processability may be degraded due to the presence of long-fiber components, and when the molecular weight distribution exceeds 10, strength may be reduced.

The colorant is added to display colors according to the use case of the vehicle rear bumper beam, and the type thereof, although not particularly limited, may include for example, carbon black, titanium black, chromium oxide, analine black, iron oxide, manganese oxide, graphite, or a compound obtained by mixing two or more thereof.

The fiber reinforcing material is for imparting at least a certain level of impact strength while maintaining a low specific gravity. In the present invention, a long-fiber-type fiber reinforcing material having a length of 5 to 20 mm is used, and in consideration of injection-moldability, a fiber reinforcing material having a length of 9 to 13 mm may desirably be used.

Moreover, the diameter of the fiber reinforcing material is desirably 100 μm or smaller, and more desirably, a fiber filament having a diameter of 1 to 50 μm may be used. In this case, the fiber reinforcing material may further include a functional group on the surface. The functional group is not particularly limited but, for example, an epoxy group, a urethane group, a silane group, an acrylic group, or a compound obtained by mixing two or more thereof may be used. By including such functional groups, the fiber reinforcing material may exhibit improved compatibility during a mixing process with a propylene homopolymer.

Meanwhile, the fiber reinforcing material is not particularly limited but, for example, a glass fiber, a carbon fiber, a metal fiber, an aramid fiber, an ultra-high-molecular-weight polyethylene fiber, a polyacrylonitrile fiber, an arylate fiber, or a polyether ketone fiber and the like may be used, and desirably, a glass fiber or a carbon fiber may be used.

Desirably, 10 to 50 wt % of such a fiber reinforcing material may be included with respect to a polyolefin resin. More desirably 10 to 30 wt %, and most desirably 15 to 25 wt % is included. When the fiber reinforcing material content is below 10 wt %, the improvement in impact strength may be unsatisfactory, and when exceeding 50 wt %, the efficiency in the improvement of the impact strength relative to the content of the fiber reinforcing material is poor, and injection molding processability may be adversely affected.

In the present invention, optimal ratios of the contents of components forming a polyolefin resin are presented such that, when the polyolefin resin described above is applied in a vehicle rear bumper beam described below, the polyolefin resin may be optimized for injection molding even when using a fiber reinforcing material in a long-fiber state. Said optimal ratios are described below in detail.

First, the weight ratio between the fiber reinforcing material and the propylene homopolymer is desirably 1:1.5 to 1:10, more desirably 1:2 to 1:6, and most desirably 1:3 to 1:5. Moreover, the weight ratio between the colorant and the fiber reinforcing material is desirably 1:1 to 1:50, more desirably 1:5 to 1:30, and most desirably 1:10 to 1:20.

Meanwhile, in the present invention, the thermoplastic resin composite may further include an additive depending on the specific use case, and may include, for example, an impact modifier, an inorganic filler, a UV blocker, an antioxidant, a lubricating agent, an antistatic agent, a fine particle, or a mixture of two or more thereof in a content of 0.1 to 10 parts by weight with respect to 100 parts by weight of the thermoplastic resin composite.

In this case, an olefin block copolymer including an ethylene-based repeating unit and an α-olefin-based repeating unit having a carbon number of 4 to 30 may be desirably used as the impact modifier, and more desirably, the olefin block copolymer having a melt flow index (ASTM D1238, 230° C., measured under a load of 2.16 kg) of 2 to 50 g/10 min may be used.

A polyolefin resin and a method for preparing the same according to the present invention have been described above. The polyolefin resin according to the present invention is a composite plastic material (long glass fiber reinforced thermoplastic, LFT) that includes a fiber reinforcing material such as a glass fiber and the like, and may be used in the injection molding of a vehicle rear bumper beam. Hereinafter, a vehicle rear bumper beam according to the present invention will be described.

In order to apply a glass fiber composite plastic material to an injection molding technique, the glass fiber composite plastic material must absorb enough crash energy to prevent the occurrence of fracture. In order for fracturing of the bumper beam to not occur, the elongation or fracture strength of the material must be increased, but due to the character of the material, increasing elongation reduces material strength, while increasing material strength reduces elongation. Thus, from a material perspective, it is difficult to increase crash energy absorption.

As described, increasing the elongation of a glass fiber composite plastic material is difficult, and thus crash energy absorption is typically made possible by increasing material strength. However, since increasing the length of a glass fiber in order to increase the strength of a material makes injection molding difficult, glass fiber composite plastic material bumper beams currently under mass production are being developed using press techniques, which have high processing costs.

Therefore, cost competitiveness can be achieved if low-speed crash performance can be satisfied in a bumper beam using an injection molding technique. A bumper beam sufficiently absorbs crash energy when the material forming the bumper beam fractures after absorbing sufficient energy by being sufficiently deformed overall. However, if the bumper beam is fractured, the sheared face damages the vehicle body, thus making it impossible to achieve the performance required by law. Therefore, after repeated research and development of a structure that allows a bumper beam to absorb as much crash energy as possible without fracturing, the present inventors were able to derive a bumper beam structure that can achieve such performance when injection-molded using a polyolefin resin.

Figure 1:
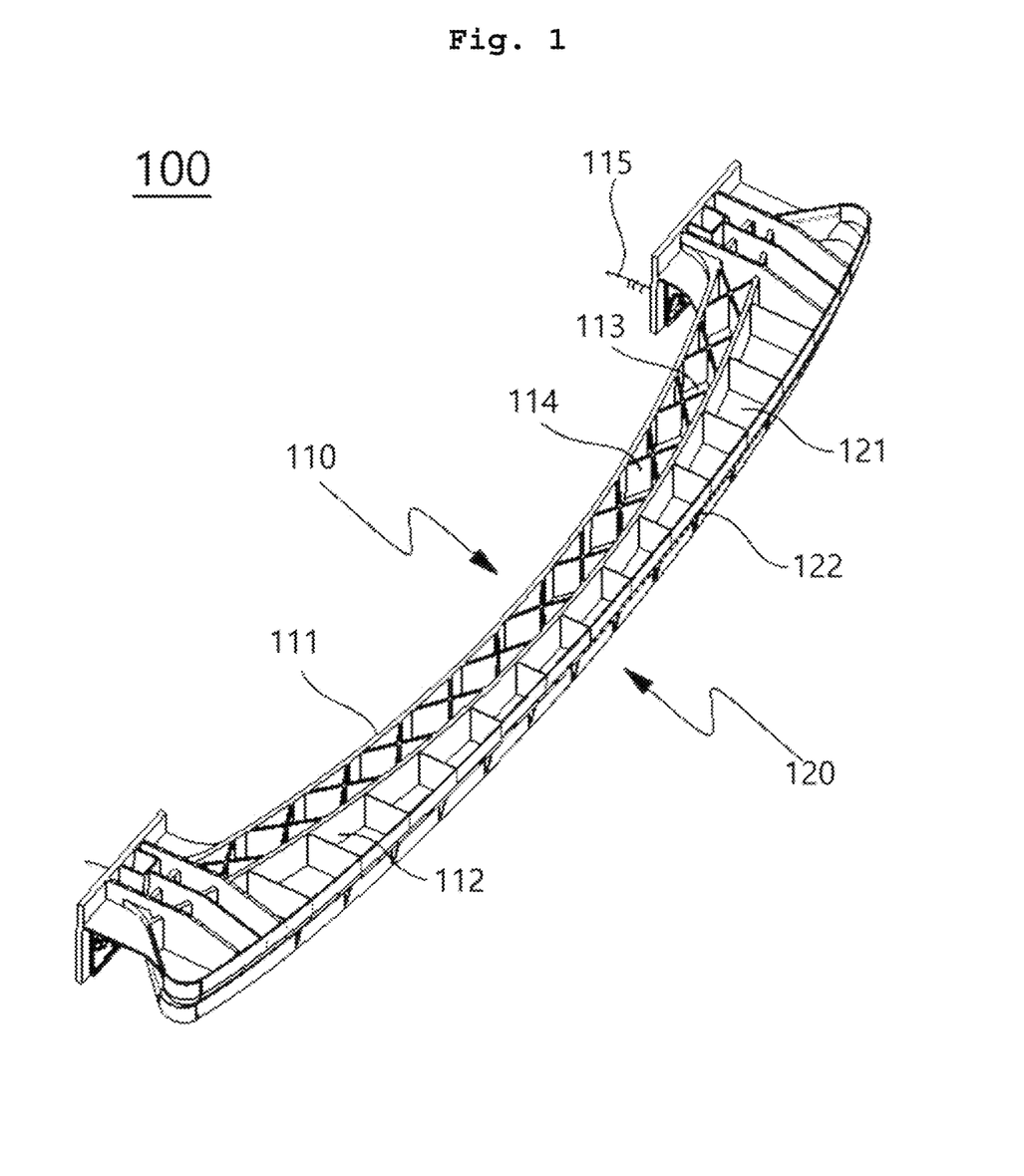
FIG. 1 is an exploded perspective view of a vehicle rear bumper beam according to an exemplary embodiment of the present invention.
Figure 2:
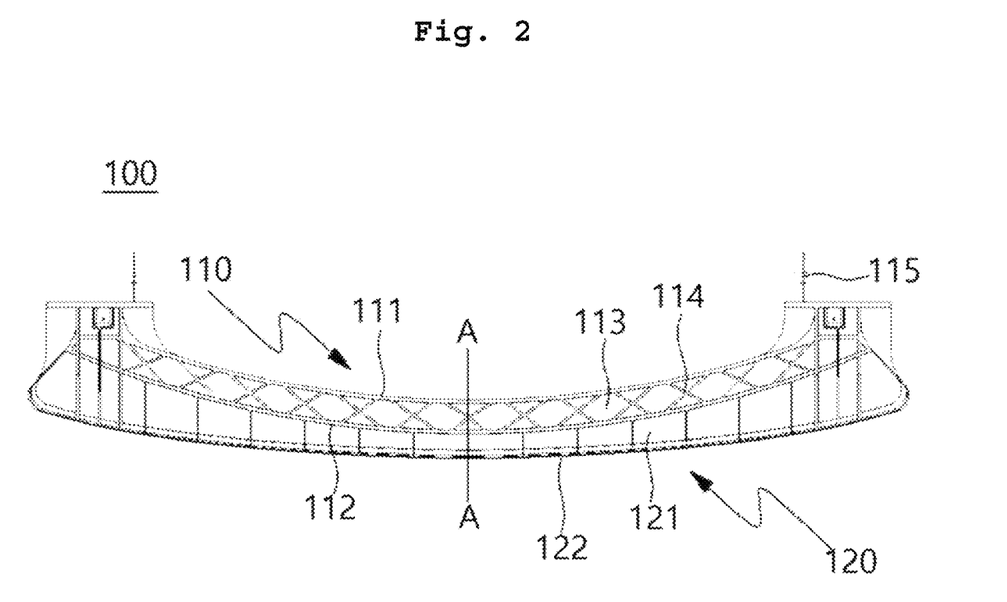
FIG. 2 is a plane view of the vehicle rear bumper beam illustrated in FIG. 1.
Figure 3:
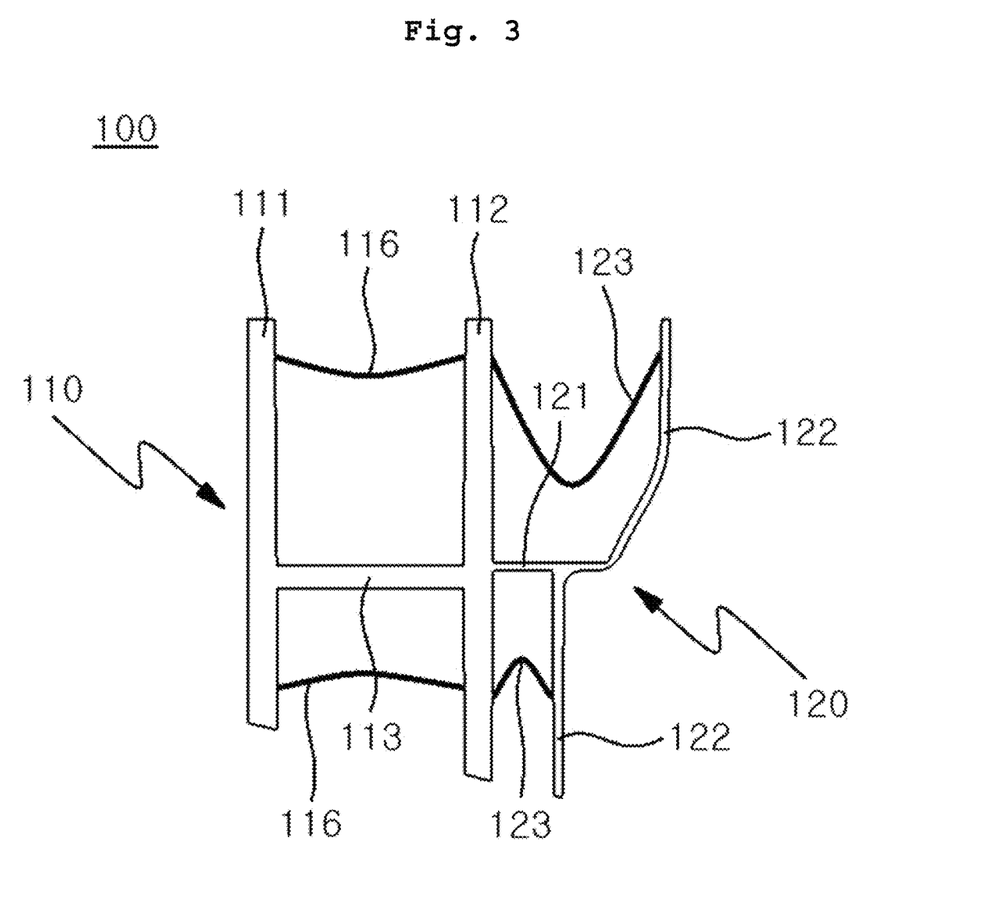
FIG. 3 is a cross-sectional view along A-A in FIG. 2.
Figure 4:
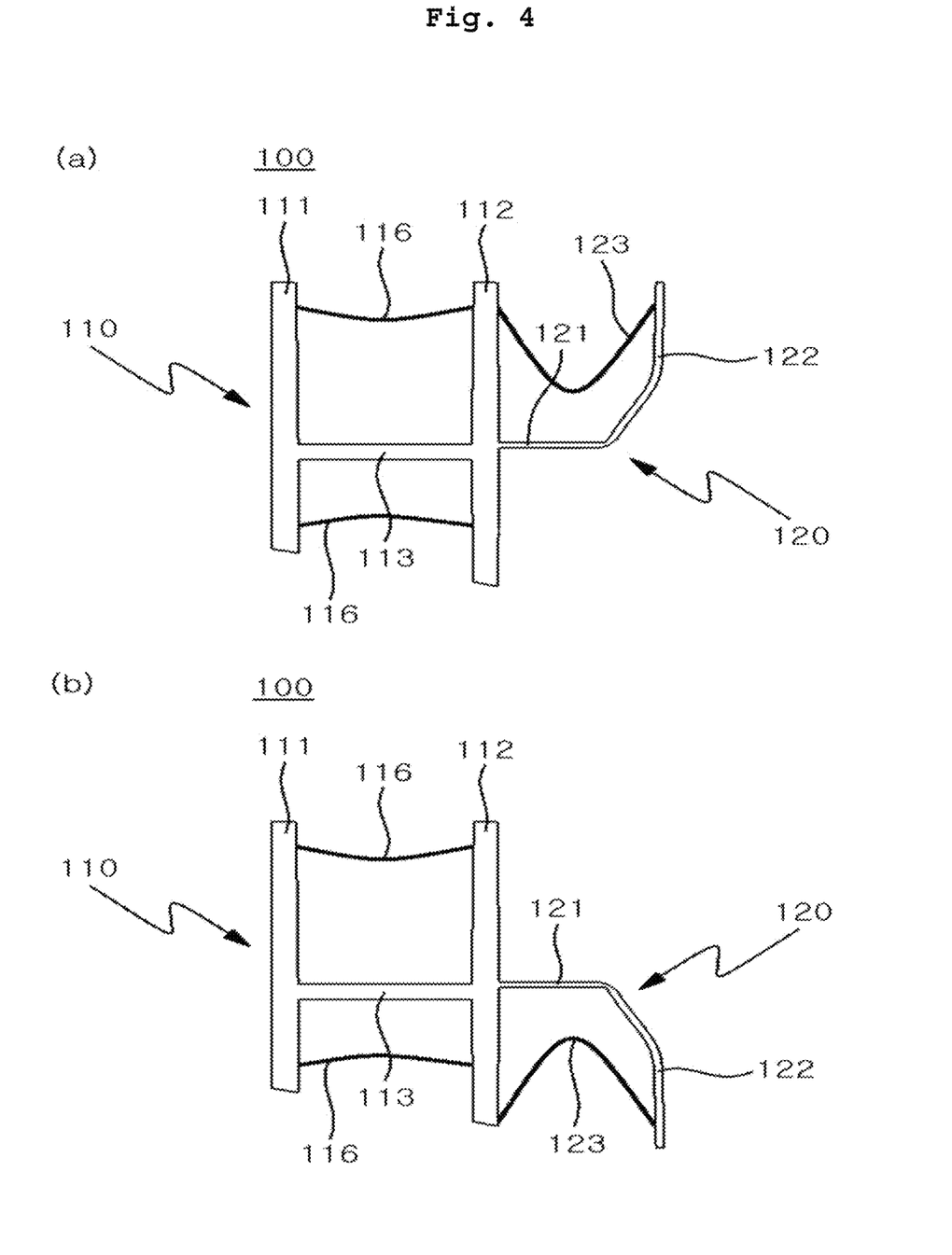
FIG. 4 shows drawings of examples of deformations of energy absorbing parts of the vehicle rear bumper beam illustrated in FIG. 3.

FIG. 1 is an exploded perspective view of a vehicle rear bumper beam according to an exemplary embodiment of the present invention, FIG. 2 is a plane view of the vehicle rear bumper beam illustrated in FIG. 1, FIG. 3 is a cross-sectional view along A-A in FIG. 2, and FIG. 4 shows drawings of examples of deformations of energy absorbing parts of the vehicle rear bumper beam illustrated in FIG. 3.

Referring to FIGS. 1 to 4, a vehicle rear bumper beam 100 according to an exemplary embodiment of the present invention includes a support part 110 and an energy absorbing part 120.

The support part 110, which is for supporting the energy absorbing part 120 in the event of a crash, includes two vertical plates 111 and 112, which are disposed parallel to each other, and a horizontal plate 113, which connects the two vertical plates 111 and 112, and thus has an H-shaped cross-sectional structure overall. The support part 110 is mounted to a vehicle (not shown in figure) using fastening members 115 provided at the rear on both ends.

Such a support part 110 must have sufficient strength and rigidity to allow the energy absorbing part 120 to become compressed and fractured in the event of a crash. Thus, the thickness of the vertical plates 111 and 112 and horizontal plate 113 is desirably about 3-6 mm, taking into consideration strength, rigidity, and processability. This is because, when the thickness of the plates 111, 112, and 113 is less than 3 mm, the supporting capacity is insufficient in the event of a low-speed crash, and when exceeding 6 mm, the required strength and rigidity is difficult to achieve due to a sink generated by cooling during injection molding.

Moreover, since the supporting capacity improves as the curvature of the vertical plates 111 and 112 increases, the curvature is minimized within the range of 1500-5000 mm, taking into consideration ease of assembly and the like, and since the distance between the two ends of a vehicle member to which the bumper beam is fastened varies depending on the vehicle, that is, whether the vehicle is a small vehicle or a large vehicle, the curvature is determined in consideration thereof.

In this case, the distance between the vertical plates 111 and 112 is desirably 30-40 mm. This is because, when the distance between the vertical plates 111 and 112 is less than 30 mm, the supporting capacity in the event of a low-speed crash is insufficient, and when exceeding 40 mm, the vertical plates 111 and 112 are close to the vehicle body panel, and thus deformation of the bumper beam following a crash can cause panel deformation to occur. Meanwhile, ribs 116 for absorbing crash energy may be formed between the vertical plates 111 and 112.

In addition, it is advantageous to apply a draft of 1-3 degrees to the vertical plates 111 and 112 in order to facilitate the release of a molded product during the injection molding of the present invention. This is because, when the draft of the vertical plates 111 and 112 is less than 1 degree, releasing the molded product is difficult, and when exceeding 3 degrees, although releasing the molded product is convenient, the weight and cost of the molded product increases.

Meanwhile, in the space defined by the vertical plates 111 and 112 and horizontal plate 113 of the support part 110, X-shaped ribs 114 are formed at certain intervals along the width direction. Such X-shaped ribs 114 prevent overall vertical twisting of the bumper beam in the event of a crash, and also minimize deformation following injection molding, thus performing the role of ensuring dimensional stability.

The energy absorbing part 120, which is for absorbing crash energy through compression and fracture in the event of a crash, is composed of a first plate 121 extending horizontally from the vertical plate 112 of the support part 110, and a second plate 122 extending upwards or downwards from the first plate 121.

In this case, the second plate 122, which is the first part that comes into contact with an impacting object, may, as illustrated in FIG. 3, be formed above and below the first plate 121 according to the shape of a bumper cover (not shown in the figure), or, as illustrated in FIG. 4, only one of the second plate 122 may be formed either above or below the first plate 121. In the present invention, the thickness of the second plate 122 is 1.5-2 mm, and a draft of 1-3 degrees is desirable when considering the production process. This is because, when the thickness of the second plate 122 is less than 1.5 mm, portions of the product are left unprocessed, and thus crash performance and the quality of the appearance are poor, and when exceeding 2 mm, compression and deformation do not occur in the event of a crash, and thus sufficient energy absorption does not occur.

Moreover, although not particularly limited, the shape of the second plate 122 is determined such that a gap of about 3-5 mm is present between the bumper beam and the bumper cover. This is because, when the gap between the bumper beam and bumper cover is less than 3 mm, deformation of the bumper beam and dimensional tolerances cause external defects in the bumper cover, and when exceeding 5 mm, not only does the bumper cover rattle around, but noise is generated due to vibrational contact between components during vehicle operation, and when the gap is excessively large, it is difficult to satisfy crash laws.

Meanwhile, a rib 123 may be formed between the first plate 121 and second plate 122. When the impacting object breaks in, the rib 123 performs the role of absorbing energy up to the allowable fracture strength of the material as the rib 123 collapses, and during normal times, has the function of supporting the second plate 122 and thereby maintaining the rattling around or shape of the bumper cover. As in the case of the second plate 122, such a rib 123 has a thickness of 1.5-2 mm in consideration of compression and collapse, and applying a draft of 1-3 degrees in consideration of the production process is desirable.

The energy absorption amount of the energy absorbing part 120 is determined according to the length of the rib 123 described above, that is, the distance from the vertical plate 112 of the support part 110 to the second plate 122 of the energy absorbing part 120, and in the present invention, is in the range of 10-100 mm, in consideration of impact energy. The vertical plate 112 has a certain curvature, and the curvature of the vertical plate 112 is formed to leave a predetermined gap with the bumper cover. Thus, even when the distance is 10 mm for the plates in a central portion, said distance increases moving away from the central portion. Here, if the distance in the central portion is made to be less than 10 mm, crash energy cannot be sufficiently absorbed, and thus fracturing of the central portion of the bumper beam occurs. Conversely, if the distance between the vertical plate 112 and the second plate 122 is made to exceed 100 mm in order to achieve sufficient energy absorption, the size of the first plate 121 and rib 123 between the vertical plate 112 and second plate 122 increases such that the weight and cost of the bumper beam rises, and sine the vehicle body panel and bumper beam become close, the vehicle body panel may be damaged after a crash.

As described above, by configuring a vehicle rear bumper beam according to the present invention as a dual bumper beam to enhance crash performance, it is made possible to apply an LFT material to an injection molding process. Crash structural analysis was carried out to evaluate the capabilities of the present invention, and the methods and results thereof are described below.

Figure 6:
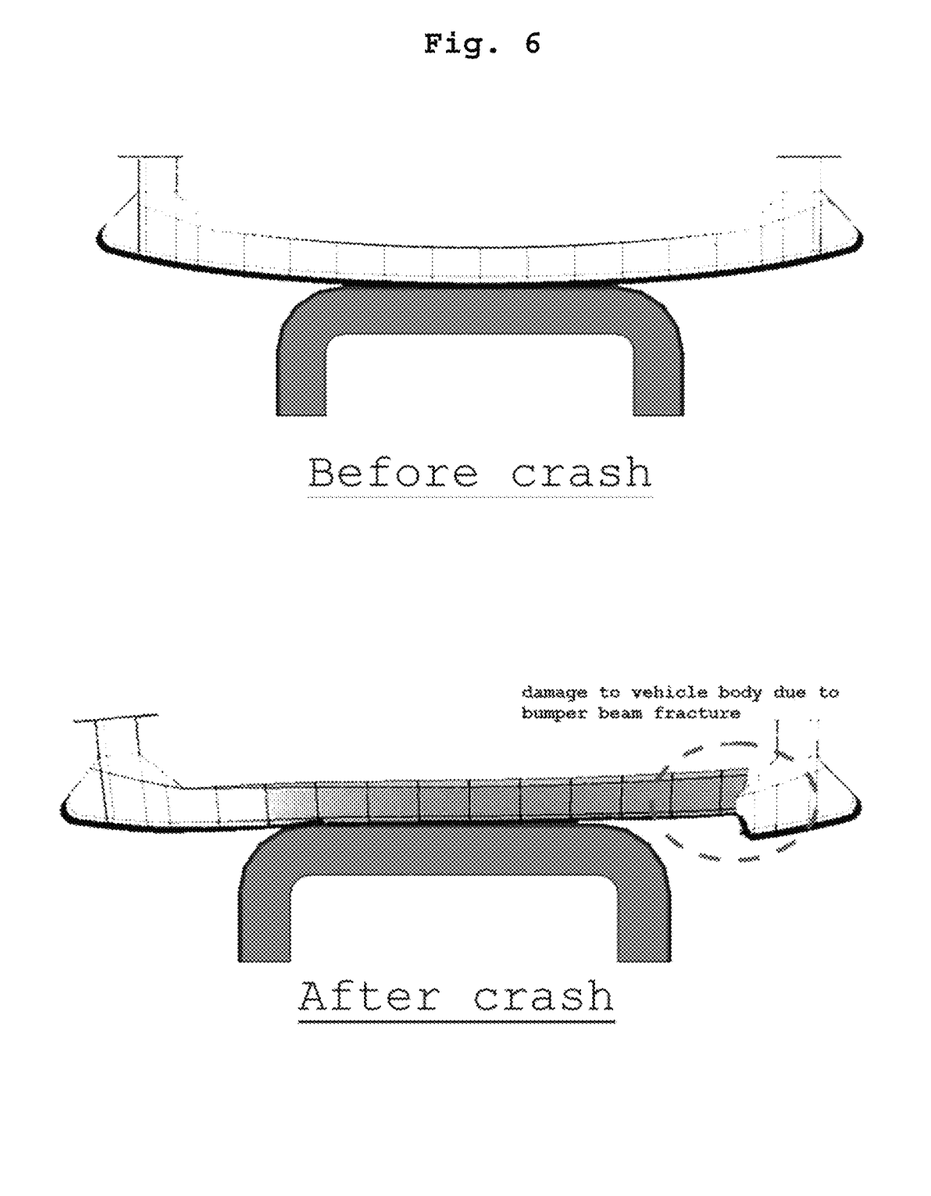
FIG. 6 shows drawings showing crash structural analysis results in the case in which an LFT material is used in a press-molded bumper beam.
Figure 7:
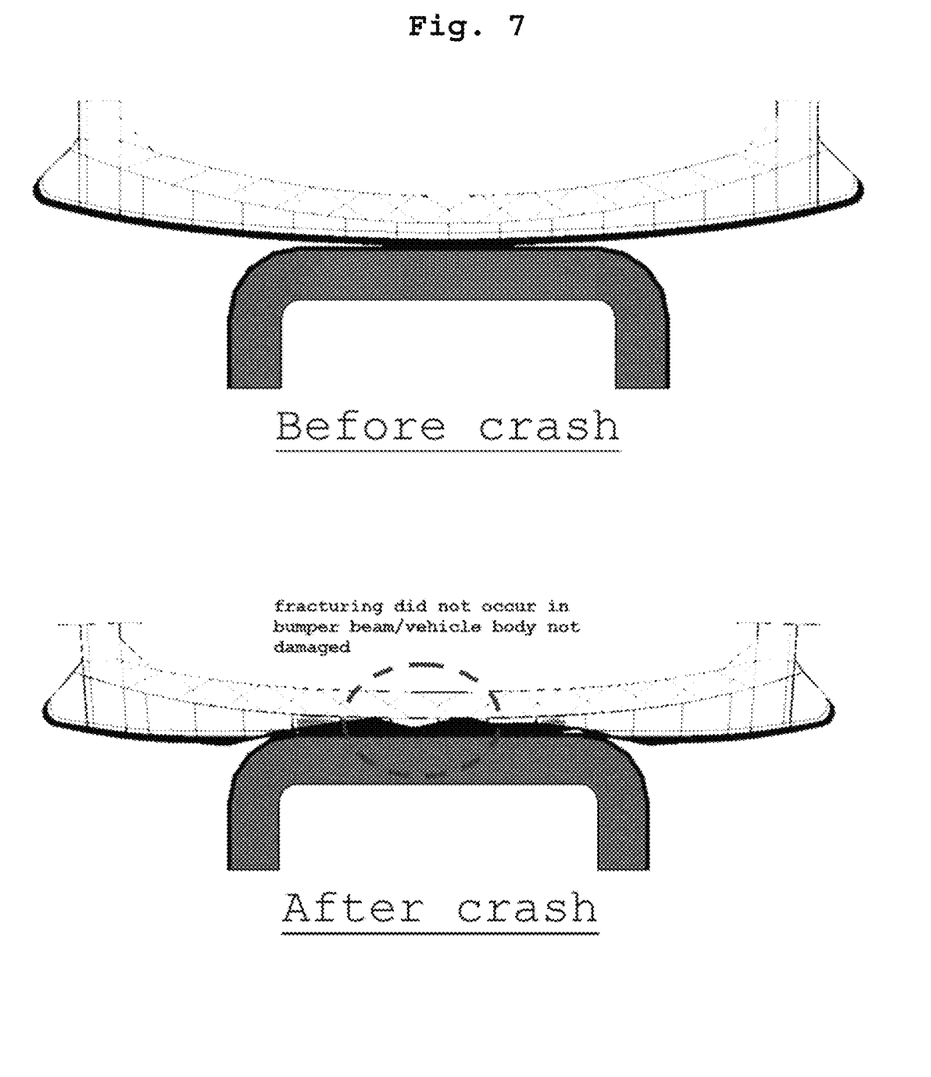
FIG. 7 shows drawings showing crash structural analysis results in the case in which an LFT material is used in an injection-molded bumper beam according to the present invention.

Specifically, a CENTER PENDULUM TEST, which is a legally mandated low-speed crash test, was carried out by applying about 2.3 kg of an LFT material, prepared by the method below, into the shape of a plastic rear bumper beam for satisfying low-speed crash laws, and the results thereof displayed in FIGS. 5 to 7.

[Method for Preparing LFT Material]

A molten mixture of a propylene homopolymer (molecular weight distribution: 5), a colorant (carbon black), and an impact modifier (olefin block copolymer, ethylene-based repeating units and butylene-based repeating units included, melt flow index (ASTM D1238, 230° C., measured under a load of 2.16 kg): 10 g/10 min) was impregnated with a fiber reinforcing material (glass fiber, length: 9-13 mm, epoxy group included on surface), and a known method was used to prepare LFT in a pellet form having a length of 10-30 mm and a cross-sectional diameter of 1-5 mm. The final composition ratio of propylene homopolymer:fiber reinforcing material:colorant:impact modifier is 60:15:1:1 by weight.

Figure 5:
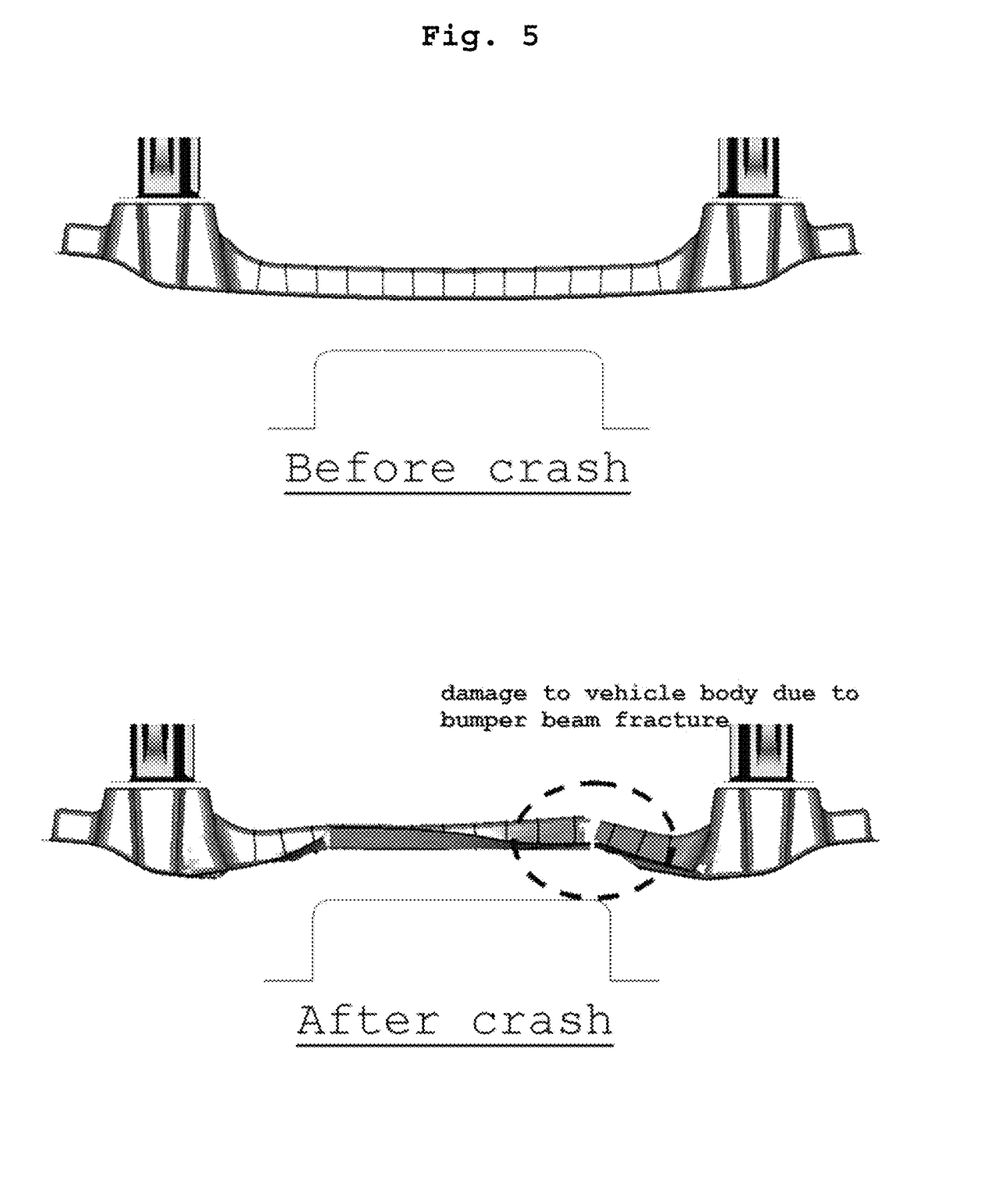
FIG. 5 shows drawings showing crash structural analysis results in the case in which an LFT material is used in an injection-molded bumper beam.

FIG. 5 is a crash structural analysis result for the case in which an LFT material is added to an injection-molded bumper beam, and it can be seen that fracturing of the bumper beam occurred. From this, vehicle damage and failure to satisfy legal requirements are expected. FIG. 6 illustrates a case in which an LFT material has been applied to a press-molded bumper beam, and, as in the case of injection molding, fracturing of the bumper beam occurred, and thus vehicle damage and failure to satisfy legal requirements are expected. FIG. 7 illustrates a case in which an LFT material is applied to an injection-molded bumper beam having an improved structure according to the present invention, and unlike the structural analysis results for the other bumper beams, fracturing did not occur and the front portion of the bumper beam, that is, the energy absorbing part, absorbed crash energy while collapsing and being compressed, and thus legally mandated performance was observed to be satisfied.

Above, exemplary embodiments of the present invention have been described in detail with reference to the drawings. Descriptions of the present invention are merely exemplary, and it is to be understood that the present inventions could be easily modified into different specific forms by a person with ordinary skill in the art, without changing the technical concept or essential properties of the present invention.

Therefore, the scope of the present invention is not specified by the detailed description, but rather by the claims disclosed below. All modifications or modified forms derived from the meaning, scope, and equivalent concepts of the claims are to be construed as being within the scope of the present invention.

DESCRIPTION OF REFERENCE NUMERALS IN THE DRAWINGS

100: a vehicle rear bumper beam
110: a support part
111, 112: a vertical plate
113: a horizontal plate
114: X-shaped ribs
115: a fastening member
116: a rib
120: an energy absorbing part
121: a first plate
122: a second plate
123: a rib

The invention claimed is:

1. A vehicle rear bumper beam comprising:
   a support part having an H-shaped cross-sectional structure including two vertical plates, which are disposed parallel to each other, and a horizontal plate, which connects the two vertical plates, one end of the support part being mounted to the vehicle; and
   an energy absorbing part formed on the opposite end of the support part,
   wherein the support part and the energy absorbing part are injection molded using a polyolefin resin comprising:
      a polymer base including a polypropylene homopolymer, which has a molecular weight distribution of 2 to 10, and a colorant; and
      a fiber reinforcing material that is impregnated into the polymer base and has a length of 5 to 20 mm, wherein 10 to 50 wt % of the fiber reinforcing material is included with respect to the polyolefin resin.

2. The vehicle rear bumper beam of claim 1, wherein an impact strength (ASTM D256) of the polyolefin resin is at least 200 J/m.

3. The vehicle rear bumper beam of claim 1, wherein a weight ratio of the fiber reinforcing material to the propylene homopolymer is 1:1.5 to 1:10.

4. The vehicle rear bumper beam of claim 1, wherein a weight ratio of the colorant to the fiber reinforcing material is 1:1 to 1:50.

5. The vehicle rear bumper beam of claim 1, wherein the polymer base further includes one or more additives selected from the group consisting of an impact modifier, an inorganic filler, a UV blocker, an antioxidant, a lubricating agent, an antistatic agent, a compatibilizer, and a fine particle.

6. The vehicle rear bumper beam of claim 5, wherein the impact modifier includes an olefin block copolymer including an ethylene-based repeating unit and an α-olefin-based repeating unit having a carbon number of 4 to 30.

7. The vehicle rear bumper beam of claim 6, wherein the olefin block copolymer has a melt flow index (ASTM D1238, 230° C., measured under a load of 2.16 kg) of 2 to 50 g/10 min.

8. The vehicle rear bumper beam of claim 1, wherein the polyolefin resin is in a pellet form having a length of 1 to 500 mm and a cross-sectional diameter of 0.1 to 50 mm.

* * * * *